US009290071B2

(12) United States Patent
McCoy et al.

(10) Patent No.: US 9,290,071 B2
(45) Date of Patent: Mar. 22, 2016

(54) COUPLER ASSEMBLY

(71) Applicant: Cequent Performance Products, Inc., Plymouth, MI (US)

(72) Inventors: Richard McCoy, Granger, IN (US); Paul Caruso, Grosse Point, MI (US); David Tallieu, Livonia, MI (US)

(73) Assignee: Cequent Perfomance Products, Inc., Plymouth, MI (US)

( * ) Notice: Subject to any disclaimer, the term of this patent is extended or adjusted under 35 U.S.C. 154(b) by 0 days.

(21) Appl. No.: 14/329,434

(22) Filed: Jul. 11, 2014

(65) Prior Publication Data
US 2014/0319802 A1 Oct. 30, 2014

Related U.S. Application Data

(63) Continuation of application No. 13/625,402, filed on Sep. 24, 2012, now abandoned, which is a continuation of application No. 12/603,755, filed on Oct. 22, 2009, now Pat. No. 8,272,662.

(60) Provisional application No. 61/196,983, filed on Oct. 22, 2008.

(51) Int. Cl.
| | |
|---|---|
| *B60D 1/06* | (2006.01) |
| *B62D 53/06* | (2006.01) |
| *B62D 53/08* | (2006.01) |

(52) U.S. Cl.
CPC *B60D 1/06* (2013.01); *B62D 53/06* (2013.01); *B62D 53/0842* (2013.01)

(58) Field of Classification Search
CPC ............. B60D 1/30; B60D 1/245; B60D 1/24
See application file for complete search history.

(56) References Cited

U.S. PATENT DOCUMENTS

| 2,635,892 A * | 4/1953 | Shutter .......................... 280/489 |
| 2,713,501 A * | 7/1955 | Peak .............................. 280/494 |
| 3,815,936 A * | 6/1974 | Oaks, Jr. .................... 280/417.1 |
| 4,926,621 A * | 5/1990 | Torras .................................. 56/6 |
| 5,890,728 A * | 4/1999 | Zilm ............................. 280/433 |
| 6,042,137 A * | 3/2000 | McIntosh .................... 280/490.1 |
| 6,186,530 B1 * | 2/2001 | Zilm ............................. 280/496 |
| 6,332,626 B1 * | 12/2001 | Morrill ..................... 280/491.3 |
| 7,000,937 B2 * | 2/2006 | Dick .......................... 280/416.1 |
| 7,540,524 B2 * | 6/2009 | Viaud .......................... 280/492 |
| 7,588,262 B1 * | 9/2009 | Zilm ............................. 280/432 |
| 7,703,792 B1 * | 4/2010 | Heitzmann et al. ........ 280/455.1 |
| 8,205,905 B2 * | 6/2012 | Zilm ............................. 280/512 |
| 8,267,419 B2 * | 9/2012 | Schuettenberg .............. 280/402 |
| 2004/0070171 A1 * | 4/2004 | Freeman .................... 280/441.2 |

* cited by examiner

*Primary Examiner* — Kevin Hurley
(74) *Attorney, Agent, or Firm* — McDonald Hopkins LLC

(57) ABSTRACT

The present application describes a gooseneck coupler assembly that may include a gooseneck trailer pivot, an extension arm, and a pivot retention mechanism having a ball socket. The ball socket may engage with a hitch ball located on a towing vehicle. The gooseneck trailer pivot may be mounted on a towed vehicle or trailer and be capable of pivoting about a vertical axis relative to the trailer. During engagement, the ball socket and the extension arm may provide tilt capability but thereby prevent any rotational movement relative to the hitch ball. However, the gooseneck coupler assembly may still be able to tilt fore-and-aft or side-to-side relative to the hitch ball. Therefore, the only pivotal movement relative to a vertical axis would be permitted at the gooseneck trailer pivot.

19 Claims, 3 Drawing Sheets

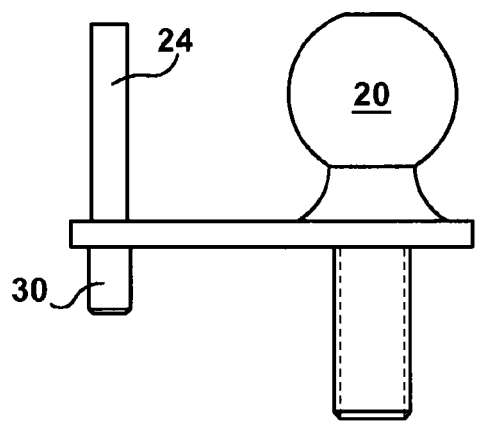
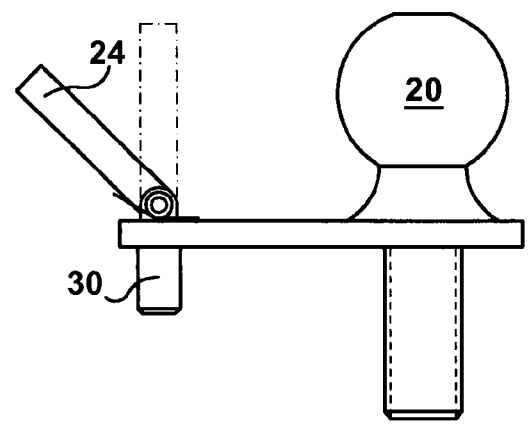
Fig. 4A   Fig. 4B
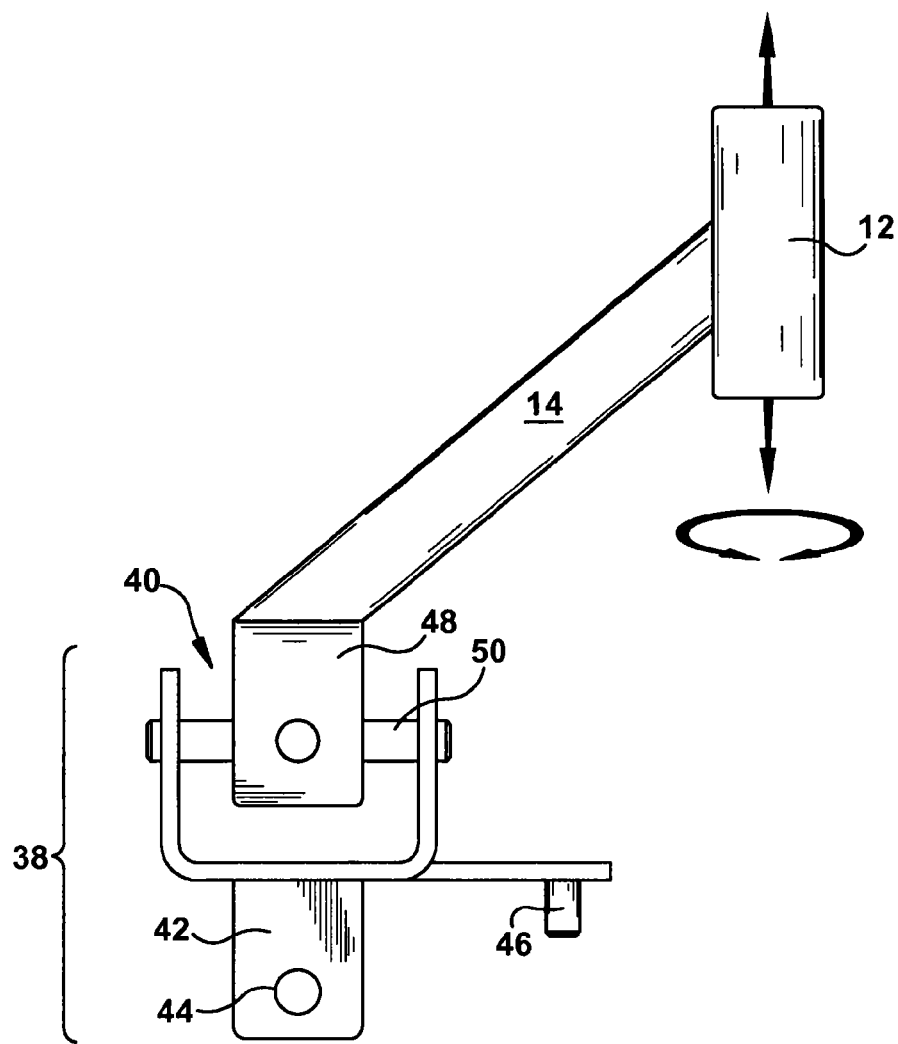
Fig. 5

COUPLER ASSEMBLY

CROSS-REFERENCE TO RELATED APPLICATION

This application is a continuation of U.S. patent application Ser. No. 13/625,402, entitled "Coupler Assembly" filed on Sep. 24, 2012, which is a continuation of U.S. patent application Ser. No. 12/603,755, entitled "Coupler Assembly" filed on Oct. 22, 2009, which claims benefit from U.S. Provisional Patent Application No. 61/196,983, entitled "Coupler Assembly," filed on Oct. 22, 2008, all of which are hereby incorporated in their entirety by reference.

FIELD OF INVENTION

The present invention is generally related to a hitch assembly and, more particularly, to a coupler assembly used for coupling a towed vehicle to a towing vehicle.

BACKGROUND

Many vehicles are designed to transport freight, goods, merchandise, personal property, and other such cargo. Often, a hitch assembly is utilized to connect a towed vehicle or trailer to a towing vehicle, such as a truck for example, to increase the capacity to transport goods. Many types of coupling devices have been developed for providing this connection between a towing vehicle and a towed vehicle. Such connections may often include a shaft-mounted, ball-type hitch member, that may be conventionally referred to as a tow or hitch ball. The hitch ball is generally attached to the towing vehicle, often in the flatbed of a truck, to permit connection to a trailer coupler. The trailer typically has a frame that extends outward so that the trailer may be attached to the towing vehicle. A trailer tongue is a portion of the frame that may extend beyond the trailer body.

Typically, the coupler may be attached to the tongue of the towed vehicle that may cooperate with the hitch ball to complete the connection from the towed vehicle to towing vehicle. The trailer coupler often has a socket portion that is sized and shaped to receive the hitch ball. The hitch ball of the towing vehicle may be removably secured to the trailer coupler to permit the towing vehicle to transport the towed vehicle, such as a trailer and its contents, boats, other vehicles, ATVs, furniture and other objects. The coupler thereby allows for the trailer to pivot behind the towing vehicle. The socket to hitch ball connection allows relative movement between the towing vehicle and the trailer as the towing vehicle makes turns, traverses uneven or rough terrain, and passes along inclining and declining roadways.

There are many different types of trailer hitches. Some of the most common types of hitches include gooseneck, fifth wheel, front mount, and others. The gooseneck hitch may use a long, extended arm having a coupler attached to the lower end thereof. The gooseneck coupler mounted to the trailer may connects to the hitch ball installed in the bed of the towing vehicle. This system of coupling the trailer to the towing vehicle permits the towing vehicle to turn at sharper angles than are permitted by a typical bumper hitch system. Often these gooseneck couplers connect oversized trailers to towing vehicles having shortened truck beds. Such a connection configuration often leads to operational difficulties.

Many trailers are generally much larger and heavier than typical trailers and often require relatively heavy towing vehicles such as heavy-duty pickup trucks to pull them. Gooseneck trailer hitches are considered to be heavy duty and are often used to fasten trailers weighing 10,000 pounds or more. Gooseneck hitches are made to accommodate things like horse trailers and other oddly shaped trailers whose weight is not evenly distributed. A gooseneck trailer hitch is often placed in the truck bed above the rear axle and the trailer is then secured to it. The gooseneck hitch is much stronger than a regular ball hitch and can haul much more weight.

Generally, a gooseneck coupler arm is mounted to the trailer at one end and has a socket at the other end that connects to the hitch ball installed in the bed of the towing vehicle. The gooseneck engages the hitch ball to pivotally engage the trailer to the towing vehicle. The trailer is thus able to pivot relative to the towing vehicle about a vertical axis through the hitch ball to facilitate cornering and parking. Normally, the hitch ball is mounted directly over or a short distance in front of the rear axle of the towing vehicle in order to maintain proper weight distribution. Thus, when the gooseneck coupler engages the hitch ball, a portion of the trailer's weight may be carried directly over the rear axle of the towing vehicle. So as to permit the turning of the towing vehicle and relative pivoting between the towing vehicle and the trailer, there must be significant clearance between the pivot point and the rear of the towing vehicle cab in order to prevent contact between the trailer and the cab.

Recently, there has been a trend towards extending pickup truck cabs. These trucks have greatly expanded interior cargo volume and also have specially designed rear jump seats for accommodating additional passengers. Unfortunately, most of these extended cab pickups are built on a standard wheelbase chassis because consumers prefer the driving characteristics of a shorter truck, and accordingly, the beds of these trucks are typically six feet long rather than eight feet long. Although these shorter bed pickups have the towing capacity to handle a heavy trailer, they do not have enough clearance between the axle and the rear of the cab to allow the trailer to pivot to a 90 degree angle without contacting the cab, which could damage the truck or towing vehicle and severely injure any occupants. In most circumstances, a trailer will contact the cab of a short bed pickup at angles much less than 90 degrees.

Therefore, there is a need in the art for an improved coupler assembly that may offset the pivot connection between the hitch ball and the trailer, such as by moving the pivot connection rearwardly. Further, so that only one pivot connection is provided, the rotational movement of the gooseneck coupler relative to the hitch ball should be prevented. Therefore, moving the pivot position rearwardly of the coupler assembly's attachment point may enable a trailer to easily handle up to a 90 degree turn.

SUMMARY

A gooseneck coupler assembly is described herein. The gooseneck coupler assembly may include a gooseneck trailer pivot, an extension arm, and a pivot retention mechanism having a ball socket. The ball socket may engage with a hitch ball located on a towing vehicle. The gooseneck trailer pivot may be mounted on a towed vehicle or trailer and be capable of pivoting about a vertical axis relative to the trailer. During engagement, the ball socket and the extension arm may provide tilt capability but thereby prevent any rotational movement relative to the hitch ball. However, the gooseneck coupler assembly may still be able to tilt fore-and-aft or side-to-side relative to the hitch ball. Therefore, the only pivotal movement relative to a vertical axis would be permitted at the gooseneck trailer pivot.

A coupler assembly may include a trailer pivot capable of engagement with a towed vehicle, an extension arm attached to the trailer pivot, and a vehicle engagement member capable of selectively engaging a hitch ball mounting aperture of a towing vehicle. The coupler assembly may also include an engaging device secured to the extension arm and attached to the vehicle engagement member, and a pivot retention member engaged with the engaging member generally preventing rotation of the towing vehicle relative to the extension arm.

A coupler assembly may include a trailer pivot capable of engagement with a towed vehicle, an extension arm attached to the trailer pivot, a vehicle engagement member capable of being mounted to a hitch ball mounting aperture of a towing vehicle, and an engaging device secured to the extension arm and attached to the vehicle engagement member. The coupler assembly may also include a first pivot retention member engaged with the engaging member generally preventing rotation of the towing vehicle relative to the extension arm, and a second pivot retention member attached to the vehicle engagement member and capable of engaging the towing vehicle generally preventing rotation of the towing vehicle relative to the extension arm.

A coupler assembly may include a trailer pivot capable of engagement with a towed vehicle, and an extension arm attached to the trailer pivot and including a mounting block. The coupler assembly may also include a mounting structure capable of being secured to a towing vehicle; the mounting structure may include a universal joint, and a mounting body.

DESCRIPTION OF THE DRAWINGS

Objects and advantages together with the operation of the invention may be better understood by reference to the following detailed description taken in connection with the following illustrations, wherein:

FIG. 4A illustrates a side view of an embodiment of the gooseneck coupler.

FIG. 4B illustrates a side view of the gooseneck coupler.

FIG. 5 illustrates a perspective view of an embodiment of the gooseneck coupler.

DETAILED DESCRIPTION

Figure 1:
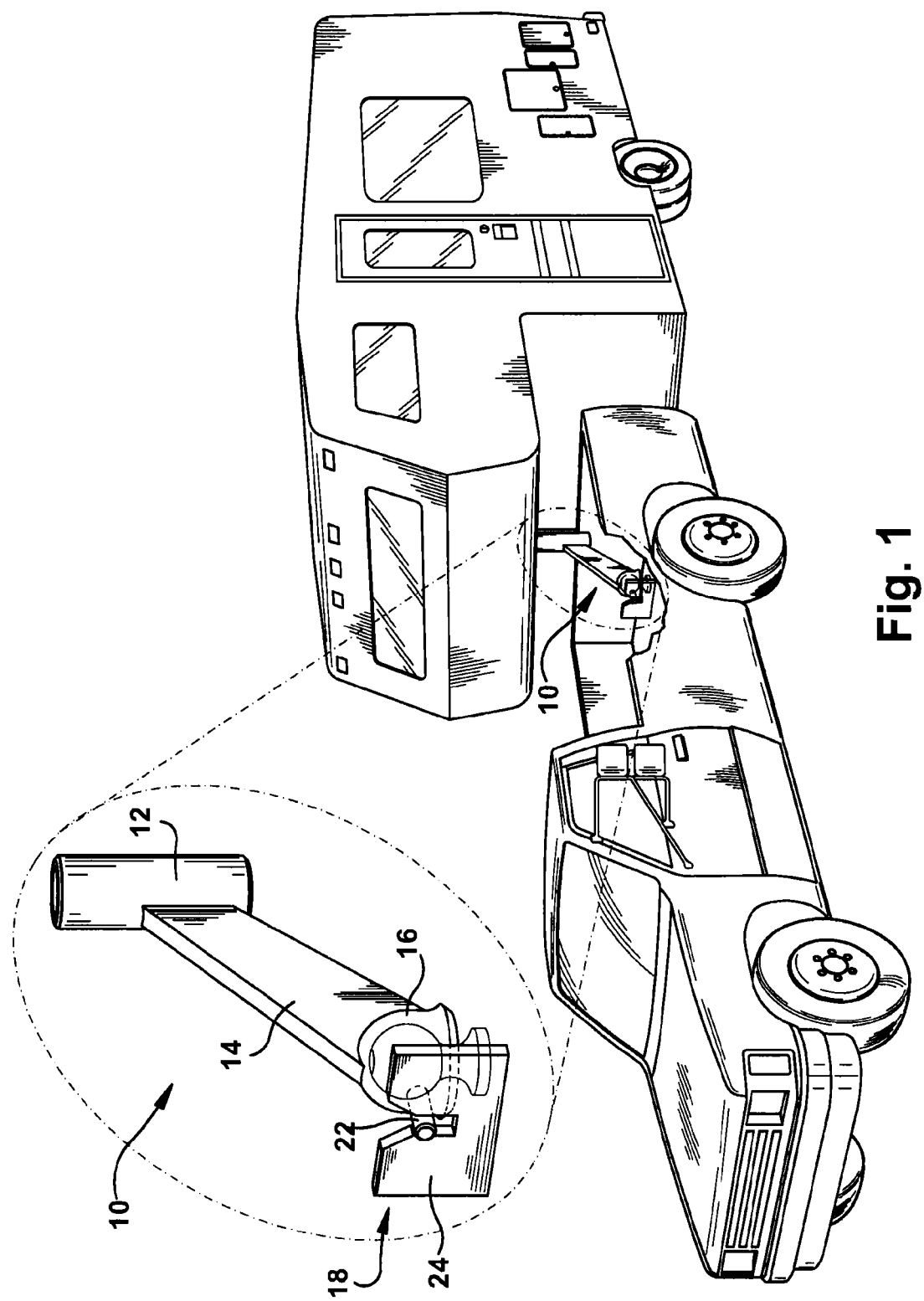
FIG. 1 illustrates a perspective view of a gooseneck coupler in an embodiment of the invention.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

A gooseneck coupler assembly 10 is illustrated in FIGS. 1 through 5. The coupler assembly 10 is generally related to trailer 52 and hitch assemblies for use on towing vehicles 32 that may be used to tow large or heavy towed vehicles. The coupler assembly 10 may be used for locking out rotation about a vertical axis of the hitch ball 20 and provide pivotal movement rearward of the hitch ball 20.

The coupler assembly 10 is intended to cover any mechanical means of limiting or stopping the vertical rotation about the hitch ball 20 in conjunction with a secondary vertical pivot, such as at axis A (shown in FIGS. 2 and 5), that may be offset by some distance at the original trailer support, such as a Gooseneck or RV trailer. For example, the coupler assembly 10 may be used in conjunction with a "Sidewinder" system produced and sold by Cequent.

The Sidewinder is a pin box coupler designed for short bed pickups that may eliminate turning and clearance issues so that a consumer may make up to 90-degree turns without exiting the truck. Sidewinder's kingpin locking mechanism moves the pivot position 20 inches rear of the coupler's attachment point from the truck bed to the pin box under the nose of the trailer. This enables the Sidewinder to handle up to a 90-degree turn. By moving the pivot rearward, the trailer tracks more closely to the tracks of the truck. This reduces the need for extra-wide turns and allows short bed pickups to jackknife with no fear of contact.

A gooseneck coupler assembly 10 may include a gooseneck trailer pivot 12, an extension arm 14, and a pivot retention mechanism 18. The gooseneck trailer pivot 12 may be positioned at any appropriate location on the towed vehicle or trailer 52. For example, the gooseneck trailer pivot 12 may be mounted to the trailer 52 and may be capable of pivoting about a vertical axis A relative to the trailer 52.

The extension arm 14 may be connected to the gooseneck trailer pivot 12 by any appropriate means, such as with fasteners, welding, or the like. The extension arm 14 may extend outwardly from the gooseneck trailer pivot 12 and may be located at an end of the gooseneck trailer pivot 14. For example, the extension arm 14 may extend substantially perpendicularly or at any appropriate angle away from the gooseneck trailer pivot 12. The extension arm 14 may be of any appropriate shape, size, such as generally circular or tubular. The extension arm 14 may be of any appropriate length, such as the desired length to connect the towed vehicle 52 to the towing vehicle 32.

Figure 3:
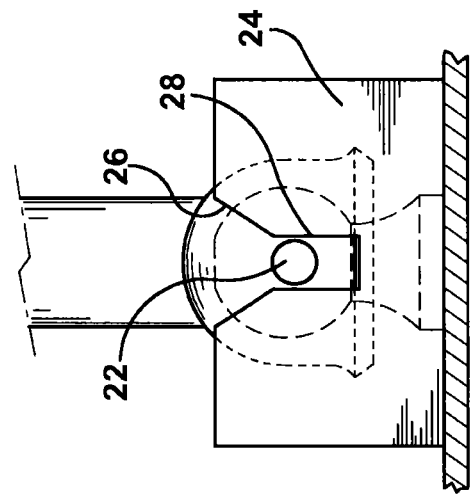
FIG. 3 illustrates a front view of an embodiment of the gooseneck coupler.
Figure 2:
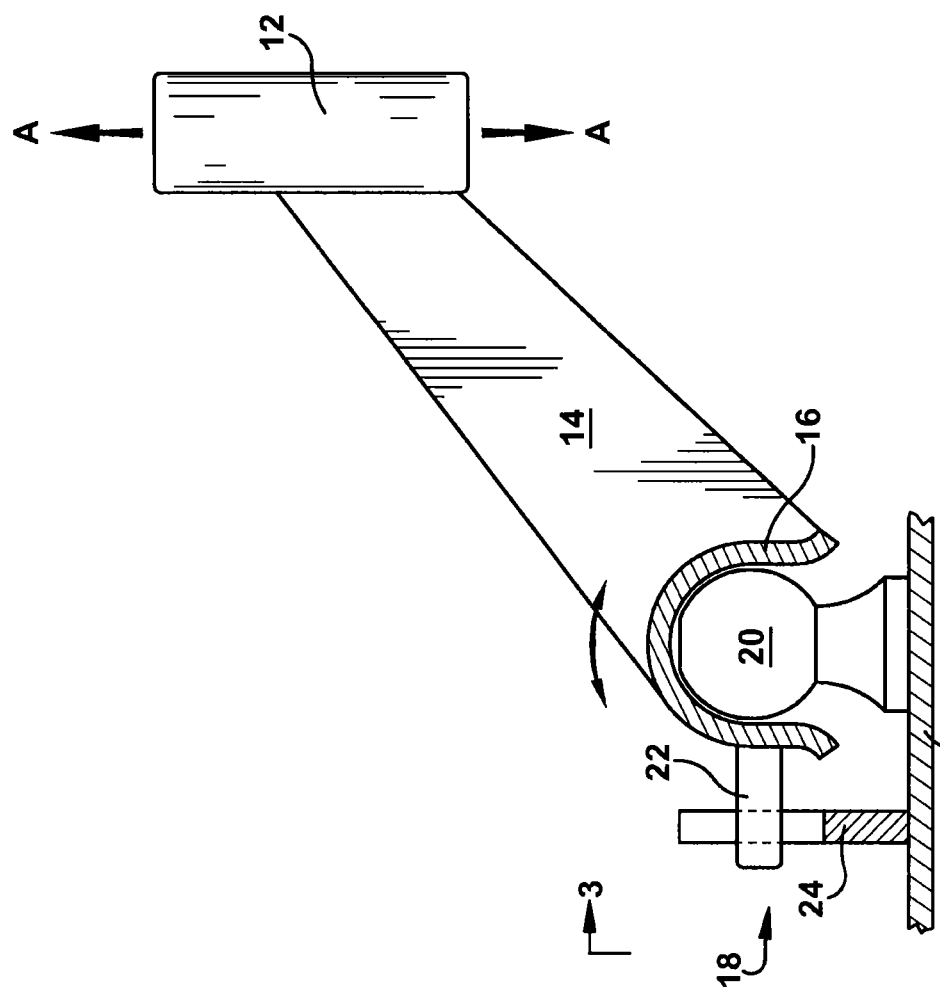
FIG. 2 illustrates a perspective view of the gooseneck coupler with a portion cut away.

The extension arm 14 may include a ball socket 16 (FIGS. 1-3). The ball socket 16 may be integrally formed within the extension arm 14 or may be a separate component. The ball socket 16 may be positioned at any appropriate location on the extension arm 14, such as at an end opposite that of the gooseneck trailer pivot 12. The ball socket 16 may be located at the end of the extension arm 14 forward of the trailer pivot 12. The ball socket 16 may by of any appropriate shape or size, such as to receive a correspondingly shaped and sized hitch ball 20.

A hitch ball 20 may be mounted to a towing vehicle 32, such as the bed of a pickup truck. The hitch ball 20 may be mounted or secured to the towing vehicle 32 by any appropriate means, such as those according to common industry practice. For example, the hitch ball 20 may be mounted within the bed of the towing vehicle 32 over the rear axle of the towing vehicle 32. The hitch ball 20 may then be secured to the frame of the towing vehicle 32 through apertures (not shown) in the bed of the towing vehicle 32.

The ball socket 16 may engage the hitch ball 20. This engagement of the ball socket 16 and hitch ball 20 may be referred to as a hitch ball assembly 36. As the ball socket 16 and hitch ball 20 are engaged, the gooseneck trailer pivot 12 may be secured to the towed vehicle or trailer 52 and may be located rearwardly relative to the hitch ball 20. Traditionally, gooseneck trailers may have a vertical tube, such as a round or square tube, welded to the front of the trailer 52 to support a gooseneck coupler on an inner vertically adjustable tube. On round tube systems, the extension arm 14 may be welded to the inner tube. Bushings may be used between the inner and outer tubes to facilitate rotation. On square tube systems, an adapter with a rotational system may be added to the bottom of the outer tube, then the extension arm 14 with trailer side rotation may be added to the side away from the trailer 52.

The coupler assembly 10 may maintain only one vertical pivot connection between the hitch ball 20 and the towed vehicle 52 (see FIG. 1). As such, a pivot retention mechanism 18 may be provided to prevent the rotation of ball socket 16 relative to the hitch ball 20 about a vertical axis A (FIG. 2), while still allowing vertical rotation about axis A at the trailer pivot 12.

The pivot retention mechanism 18 illustrated in FIGS. 1 and 2 may include a pivot retention arm 22 and a support plate 24. The pivot retention arm 22 may be of any appropriate shape or size, such as substantially rectangular, ovular or circular. The pivot retention arm 22 may be connected near the socket 16 to provide engagement with the support plate 24. The pivot retention arm 22 may be a non-rotating element and may extend outwardly to engage the support plate 24.

The support plate 24 may be of any appropriate shape or size. The support plate 24 may be secured to the towing vehicle 32 by any appropriate means, such as with fasteners, welding, or the like. The support plate 24 may be mounted to either the hitch ball assembly 36 or to the towing vehicle 32, such as on a platform 34 that may extend from the hitch ball 20 (FIGS. 4A and 4B). The support plate 24 may be located on or adjacent to the hitch ball assembly 36.

The support plate 24 may be located on any side of the hitch ball 20, such as the front, back, or either side, so long as it is lined up with the center of the hitch ball 20 and allows the coupler assembly 10 to articulate but not rotate. The key is for the non-rotating joint to allow articulation without rotation. The contact point or ball socket 16 should remain on center with the hitch ball 20, preferably on the for and aft axis or side to side axis through the center of the hitch ball 20.

The pivot retention mechanism 18 may include a retention pocket 28. The retention pocket 28 may be positioned in any appropriate location, such as in the support plate 24. The retention pocket 28 may be located in the support plate 24 may include a lead in bevel or alignment opening 26 to facilitate centering with the pivot retention arm 22 when the hitch ball 20 is being coupled with the trailer 52.

The alignment opening 26 may be of any appropriate shape or size, such as a generally angled shape transitioning from a wider opening to a narrower opening (FIGS. 1 and 3). The alignment opening 26 may guide the pivot retention arm 22 into a retention pocket or slot 28. The retention pocket 28 may be of any appropriate shape or size, such as generally rectangular or a vertical notch. The retention pocket 28 may be correspondingly shaped and sized to receive the pivot retention arm 22.

The retention pocket 28 may be centered with the hitch ball 20, such as being mounted on center in any of the four axis located through the hitch ball 20. The retention pocket 28 and support plate 24 must be able to resist rotational forces of the trailer 52 when turning or backing up. When the hitch ball 20 is coupled, the pivot retention arm 22 may be lowered into and located within the retention pocket 28. This may restrict rotation when the coupler assembly 10 is latched.

During engagement, the alignment opening 26 may allow for adjusting movement of the pivot retention arm 22 during hook up. The ball socket 16 may have the pivot retention arm 22 extending outwardly from the center of the ball socket 16 to engage the vertical slot or retention pocket 28. The alignment opening 26 may guide the retention arm 22 into position within the retention slot 28. Therefore, during engagement, the ball socket 16 and the extension arm 14 may provide tilt capability but thereby prevent any rotational movement relative to the hitch ball 20. However, the gooseneck coupler 10 may still be able to tilt fore-and-aft or side-to-side relative to the hitch ball 20. Therefore, only pivotal or rotational movement relative to a vertical axis A would be permitted at the gooseneck trailer pivot 12.

The support plate 24 may be connected to the hitch ball assembly 36. Depending on the rotational resistance of the hitch ball assembly 36 or mounting structure 38, a pin 30, 46 may engage the bed of the towing vehicle 32 or a flat plate (not shown) may be bolted to the towing vehicle 32. As an alternative, there may be anti-rotational features located where the hitch ball assembly 36 engages the gooseneck hitch. For example, a square shank and square hole coupler may be used. As another example, a round shank may have two off center pins (not shown) located in the bottom of the hitch ball 20 may engage the gooseneck hitch at the bottom of the hitch ball 20.

The coupler assembly 10 illustrated in FIGS. 4A and 4B may include a secondary pin 30. The secondary pin 30 may be of any appropriate shape or size, such as generally circular or rectangular. The support plate structure 24 may be permanently attached to the bed of the towing vehicle 32 or may be attached to the hitch ball 20. The support plate 24 may be spring biased and capable of pivoting during hookup to allow for engagement with the vertical retention pocket 28.

The pivot retention arm 22 may extend in any appropriate direction from the ball socket 16, such as at any 90 degree position relative to the position shown in FIG. 1. Therefore, this coupler assembly 10 configuration may substantially eliminate rotation about the vertical axis at the hitch ball 20, while allowing for side-to-side and fore-and-aft pivoting as explained above.

As an alternative, a yoke (not shown) may be used in place of the hitch ball 20. The yoke may have any appropriate number of points, such as a three way or a four way yoke. The four way yoke may allow for articulation, but not rotation at the towing vehicle. At the other end of the extension arm 14, there may be a vertical pivot where the trailer 52 may have a coupler, located six or more inches away from the cab of the towing vehicle 32 to provide extra clearance between the towing vehicle 32 and the towed vehicle 52.

The coupler assembly 10 illustrated in FIG. 5, may include a mounting structure 38. The mounting structure 38 may be located within the flatbed of the towing vehicle 32. The mounting structure 38 may include a universal joint 40 and a mounting body 42. The universal joint 40 may be of any appropriate shape or size, such as a substantially U-shape. The mounting body 42 may include a pin-receiving aperture 44. The pin-receiving aperture 44 may be of any appropriate shape or size, such as generally circular, rectangular or ovular.

The pin-receiving aperture 44 may permit the mounting structure 38 to be connected to the frame of the towing vehicle 32. The mounting structure 38 may be connected to the towing vehicle 32 by any appropriate means, such as with fasteners, welding or the like. For example, the mounting body 42 may be located in a similar configuration and location as how a hitch ball 20 would be located.

The universal joint 40 may also include an anti-rotation pin 46. The anti-rotation pin 46 may extend generally perpendicularly and outward from the universal joint 40. The anti-rotation pin 46 may engage the bed and/or the frame of the towing vehicle 32 through an aperture (not shown) in the bed of the towing vehicle 32. The extension arm 14 may include a mounting block 48 extending outwardly there from. The mounting structure 38 may also include a mounting pin 50.

The mounting pin 50 may connect the mounting block 48 to the universal joint 40 to provide tilt capability but thereby preventing any rotational movement at the mounting structure 38 in the towing vehicle. The tilt capability may be fore-and-aft or side-to-side. Therefore, only pivotal movement relative to a vertical axis A would be permitted at the gooseneck trailer pivot 12.

The coupler assembly 10 may provide for the ability to easily lock out rotation about a vertical axis of the hitch ball 20 and provide pivotal movement rearward of the hitch ball 20. It may be important to have the extension arm 14 in line with the hitch ball 20 thereby permitting clean articulation at the hitch ball 20. By locking out vertical rotation at the hitch ball 20, a second gooseneck trailer pivot point may be located substantially rearward. This second pivot point may allow the trailer 52 to pivot about the vertical axis A behind the rear axle of the towing vehicle while the vertical loads of the system are maintained over or ahead of the rear axle.

The coupler assembly 10 may provide for pivotal movement of the towed vehicle or trailer 52 rearwardly of the engagement point of the trailer 52 to the towing vehicle 32. This may be further accomplished by preventing rotation at the ball socket 16, and thereby the extension arm 14, about a vertical axis relative to the hitch ball 20 so that only one pivot point is provided. Therefore, the gooseneck coupler assembly 10 may allow the towed vehicle or trailer 52 to pivot relative to the towing vehicle, such as about vertical axis A, during turning operations.

Therefore, moving the pivot position rearwardly of the gooseneck coupler assembly's 10 attachment point would easily enable a trailer 52 to handle up to a 90 degree turn effortlessly. By moving the pivot rearward, the trailer 52 may be able to track more closely to the tracks of the towing vehicle and thereby reduce the need for taking extra-wide turns. In addition, with the towing position of the gooseneck coupler assembly 10 locked in line with the towing vehicle, the consumer could make full use of the bed space in the towing vehicle, giving the consumer extra storage.

Although the embodiments of the invention have been illustrated in the accompanying drawings and described in the foregoing detailed description, it is to be understood that the invention is not to be limited to just the embodiments disclosed, but that the invention described herein is capable of numerous rearrangements, modifications and substitutions without departing from the scope of the claims hereafter.

Having thus described the invention, we claim:

1. A coupler assembly comprising:
   a trailer pivot capable of engagement with a towed vehicle;
   an extension arm attached to the trailer pivot;
   a vehicle engagement member capable of selectively engaging a hitch ball mounting aperture of a towing vehicle;
   an engaging device secured to the extension arm and attached to the vehicle engagement member; and
   a pivot retention member engaged with the engaging device generally preventing rotation of the towing vehicle relative to the extension arm.

2. The coupler assembly of claim 1, wherein the trailer pivot includes a generally vertical axis whereby the towed vehicle may rotate relative to the vertical axis.

3. The coupler assembly of claim 2, wherein the towed vehicle is capable of tilting relative to towing vehicle at the vehicle engagement member.

4. The coupler assembly of claim 3, wherein the towed vehicle is capable of tilting fore and aft relative to the vertical axis at the vehicle engagement member.

5. The coupler assembly of claim 1, wherein the vehicle engagement member includes a mounting body shaped and sized to be secured to the hitch ball mounting aperture of the towing vehicle.

6. The coupler assembly of claim 5, wherein the engaging device includes a mounting block and a generally U-shaped bracket attached to the mounting body.

7. The coupler assembly of claim 6, wherein the pivot retention member includes a mounting pin attached to the generally U-shaped bracket and engageable with the mounting block generally preventing rotation of the towing vehicle relative to the extension arm.

8. The coupler assembly of claim 7, wherein the mounting pin prevents rotation about a first vertical axis at the mounting body.

9. The coupler assembly of claim 8, wherein the trailer pivot is capable of rotation about a second vertical axis.

10. The coupler assembly of claim 1, wherein the vehicle engagement member includes a socket attached to the extension arm and a hitch ball engaged with the socket and attached to the hitch ball mounting aperture of the towing vehicle.

11. The coupler assembly of claim 10, wherein the engaging device includes a retention arm attached to the socket.

12. The coupler assembly of claim 11, wherein the pivot retention member includes a support plate attached to the towing vehicle.

13. The coupler assembly of claim 12, wherein the retention arm is generally aligned with a center of the hitch ball.

14. The coupler assembly of claim 13, wherein the retention arm is capable of engaging the support plate.

15. The coupler assembly of claim 14, wherein the support plate includes a retention pocket capable of engaging the retention arm.

16. A coupler assembly comprising:
   a trailer pivot capable of engagement with a towed vehicle;
   an extension arm attached to the trailer pivot;
   a vehicle engagement member capable of being mounted to a hitch ball mounting aperture of a towing vehicle;
   an engaging device secured to the extension arm and attached to the vehicle engagement member;
   a first pivot retention member engaged with the engaging member generally preventing rotation of the towing vehicle relative to the extension arm; and
   a second pivot retention member attached to the vehicle engagement member and capable of engaging the towing vehicle generally preventing rotation of the towing vehicle relative to the extension arm.

17. The coupler assembly of claim 16, wherein the vehicle engagement member includes a platform and the second pivot retention member includes a pin capable of engaging the towing vehicle.

18. The coupler assembly of claim 17, wherein the vehicle engagement member includes a socket attached to the extension arm and a hitch ball attached to the platform and engaged with the socket.

19. The coupler assembly of claim 17, wherein the vehicle engagement member includes a mounting body attached to the platform.

* * * * *